Oct. 17, 1939.    G. E. LOFGREN    2,176,139
VACUUM CLEANER
Filed Jan. 11, 1938
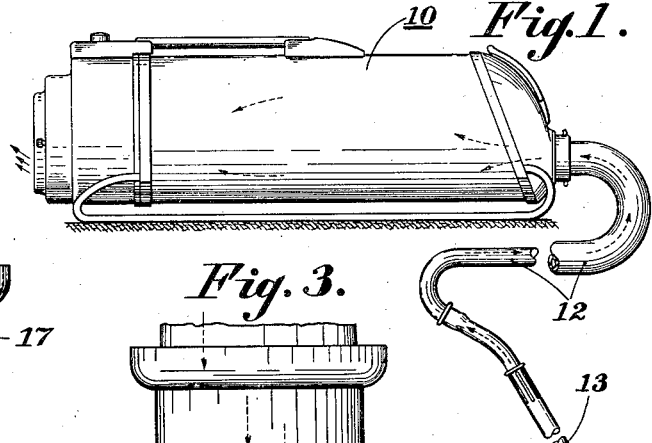
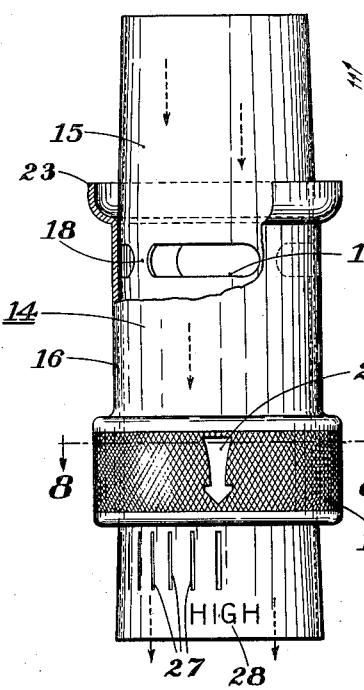
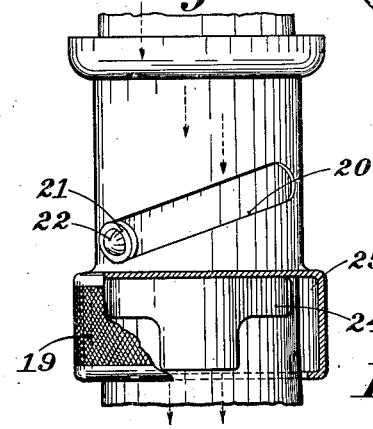
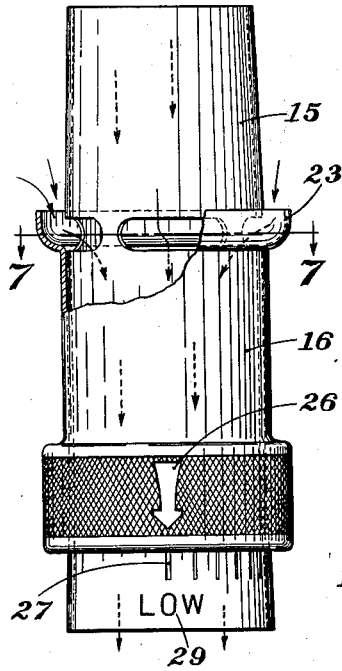
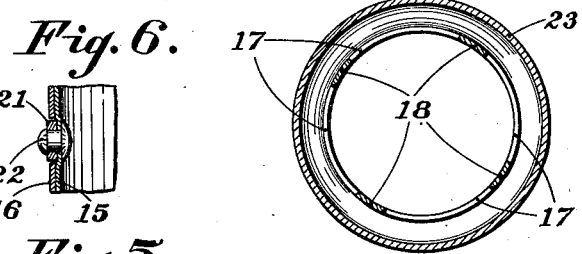
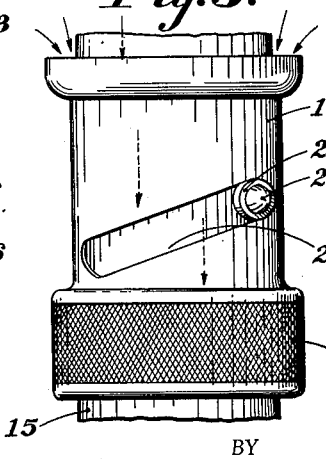
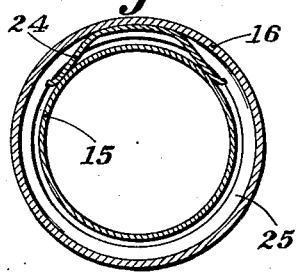
INVENTOR.
Gustaf Einar Lofgren
BY Arthur G. Prangley
His ATTORNEY.

Patented Oct. 17, 1939

2,176,139

UNITED STATES PATENT OFFICE 2,176,139

VACUUM CLEANER

Gustaf Einar Lofgren, Riverside, Conn., assignor to Electrolux Corporation, Dover, Del., a corporation of Delaware Application January 11, 1938, Serial No. 184,377

3 Claims. (Cl. 251—4)

My invention relates to vacuum cleaners and more particularly to means for regulating the flow of air through a cleaning tool connected to the vacuum cleaner.

An object of my invention is to provide an air flow regulator which may be connected between a vacuum cleaner unit and a cleaning tool to vary the flow of air through the cleaning tool.

Another object of my invention is to provide an air flow regulator with means for readily varying the flow of air through the cleaning tool and for maintaining a selected position for the regulator.

A further object of my invention is to provide an air flow regulator for a vacuum cleaner with a plurality of intermediate positions between a fully closed position permitting a maximum flow of air through the cleaning tool and a fully open position reducing the flow of air through the cleaning tool to a pre-determined minimum amount.

A still further object of my invention is to provide an air flow regulator which will regulate the flow of air through the cleaning tool without interfering with the efficient operation of the cleaning tool.

What I consider to be novel and my invention may be better understood by reference to the following specification and appended claims when considered in connection with the accompanying drawing, in which Fig. 1 is a side view of the vacuum cleaner unit with a cleaning tool connected to it embodying my improved air flow regulator;

Fig. 2 is a view partly in section of the air flow regulator in the closed position;

Fig. 3 is a rear view of the air flow regulator in the closed position;

Fig. 4 is a view of the air flow regulator in the open position;

Fig. 5 is a rear view of the air flow regulator in the open position;

Fig. 6 is a detailed view;

Fig. 7 is a sectional view taken along lines 7—7 of Fig. 4; and

Fig. 8 is a sectional view taken along the line 8—8 of Fig. 2.

Referring to the drawing, 10 indicates a vacuum cleaner unit connected to a cleaning tool 11 by a flexible hose 12 with or without a plurality of substantially rigid tubular members 13. For varying the flow of air through the cleaning tool 11, an air flow regulator 14 is interposed between the cleaning unit 10 and the cleaning tool 11.

In cleaning relatively heavy fabrics, such as rugs, upholstered furniture, and the like, it is desirable to have as great a flow of air through the cleaning tool 11 as possible, as the greater the flow of air the higher the velocity of the air entering the cleaning tool 11 and so the heavier the particles of dirt or dust that may be entrained by the air and passed into the cleaning unit 10. However, in cleaning light fabrics, such as window curtains, draperies and the like, a high velocity of air entering the cleaning tool may cause the light fabrics to be drawn within the body of the cleaning tool 11. This may interfere with the cleaning of such light fabrics. Air flow regulator 14 is adapted to be located between the cleaner unit 10 and the tool 11 and may be adjusted to permit a portion of the air to enter beyond the cleaning tool 11 when it is desired to reduce the flow of air through the cleaning tool for cleaning light fabrics.

The air flow regulator 14 consists of an inner tube 15 and an outer sleeve 16. Tube 15 is provided with a plurality of openings 17 spaced around the circumference of the tube 15 forming a substantially continuous annular orifice interrupted only by portions 18 serving to preserve the continuity of the tube 15. In the closed position, the sleeve 16 covers the openings 17 as shown in Fig. 2. In this position all of the air passing through the vacuum cleaner unit 10 must enter through the cleaning tool 11. This permits the use of the maximum air flow for the cleaning of heavy fabrics and removing heavy particles of dirt and dust. When it is desired to change the flow of air through the cleaning tool 11, the sleeve 16 is rotated by grasping a knurled finger grip 19. As the sleeve 16 is rotated it is moved downwardly or upwardly depending upon the direction of rotation by means of an inclined slot 20 in sleeve 16 and a fixed roller 21 secured to tube 15 by means of a rivet 22. As shown in Fig. 3, the slot 20 is inclined upwardly from the left to the right, and so as the sleeve 16 is rotated to the left it is moved downwardly. When the sleeve 16 has been moved downwardly a sufficient amount the openings 17 are partially or wholly uncovered permitting air to enter through the openings 17 and by-pass the cleaning tool 11.

Air entering the cleaning tool 11 passes through the tube 15 in the direction indicated by the arrows in Figs. 2 and 4. If the air were permitted to enter from one side only of the tube 15 through the openings 17 an unequal pressure condition would be created within the tube 15 tending to produce turbulence. Any turbulence in the tube 15 would reduce the flow of air through the cleaning tool 11 greater than by the amount entering through the openings 18. Such a turbulence may also result in an undesirable noise. By providing the openings 17 in the form of a substantially continuous orifice around the circumference of tube 15, air is admitted equally from all sides. It has been found that if air is permitted to enter the openings 17 from all directions the abrupt change in direction of some of the air entering in a direction opposite to the direction of the flow of air through the tube 15 it will produce a construction at the openings 17 and may also produce turbulence. This would also reduce the flow of air through the cleaning tool 11 by an amount greater than the amount of air entering the openings 17. An outwardly flared flange or hood 23 is formed integrally with sleeve 16 overlapping the openings 17 when the sleeve 16 is in the fully open position indicated in Fig. 4 to insure the entrance of the air through the openings 17 in the same direction as the air passing through the tube 15. This allows the air to enter the openings 17 only from the same direction as the flow of air in the tube 15 and directs it inwardly. The direction of the entrance of air in the openings 17 is indicated by arrows in Fig. 4. Heavy particles of dirt, such as sand entering the cleaning tool 11 may have an initial momentum in a direction at an angle to the axis of tube 15. Such heavy particles striking the tube 15 at the openings 17 would pass out the openings. The hood 23 would stop the outward movement of the particles of dirt and the air entering the openings 17 would carry these particles of dirt back into the tube 15. In a like manner the hood 23 would prevent any particles of dirt thrown out by centrifugal force due to rotary movement of the air through the tube 15 from passing out into the room. The flange 23 also serves to prevent the drawing of light fabrics over the openings 17 by the air flow through them.

When the sleeve 16 is in the fully open position the roller 21 is at the right of the slot 20 of sleeve 16 as indicated in Fig. 5. If it is desired to reduce the flow of air through the cleaning tool 11 by an amount less than the maximum amount permitted by the fully open position of Fig. 4, the sleeve 16 may be positioned in an intermediate position. A U-shaped spring 24 is provided with the two arms engaging the tube 15 and the top of the U engaging sleeve 16 for holding the sleeve 16 in an intermediate position between the fully open and the fully closed position. Spring 24 is located within an annular chamber 25 formed in the sleeve 16. The friction produced by the engagement of the spring 24 with the tube 15 and sleeve 16 is sufficient to hold the sleeve 16 in any intermediate position desired. An arrow 26 is provided on the sleeve 16 pointing toward spaced lines 27 marked on tube 15 for indicating the relative position of the sleeve 16 with respect to the tube 15. The line 27 at the extreme right indicates the fully closed position and is marked with the word "High" at 28. When the sleeve 16 is in this position a high flow of air through the cleaning tool 11 is obtained. Similarly, the line 27 at the left in Fig. 4 is marked with the word "Low" at 29 to indicate a low flow of air through the cleaning tool.

In the operation of the vacuum cleaner 10 for cleaning rugs and other heavy fabrics it is desirable to use the maximum air flow through the cleaning tool 11 that can be obtained. So for cleaning such heavy fabrics it is not necessary to use the air flow regulator 14. However, when the vacuum cleaner unit 10 is to be used for cleaning both light and heavy fabrics it is convenient to have the air flow regulator located in position between the vacuum cleaner unit 10 and the cleaning tool 11, so that it is simply necessary to adjust the air flow regulator 14 to obtain the desired air flow for cleaning the particular fabric desired.

In cleaning heavy fabrics, such as rugs, a different cleaning tool 11 is ordinarily used than for cleaning curtains, draperies, and other light fabrics, so when changing the cleaning tool 11 for cleaning different fabrics, the air flow regulator may be conveniently inserted. After the air flow regulator 14 has been set for cleaning a particular fabric, it is unnecessary to change that setting when continuing to clean the same type of fabric. It is only necessary to change the setting when a lighter or heavier fabric is to be cleaned.

What I claim is:

1. An air flow regulator for a vacuum cleaner comprising an inner tube having an orifice, a sleeve located on said tube and slidable along the tube to cover and uncover said orifice, and a flange secured to and spaced from said sleeve and overlying said orifice when the sleeve uncovers the orifice whereby any dirt particles escaping through the orifice will impinge against the flange and be carried back into the tube by air entering said orifice.

2. An air flow regulator for a vacuum cleaner including an inner tube having an orifice, a sleeve located on said tube having an inclined slot and slidable along the tube to cover and uncover said orifice, a pin secured to said tube and engaging in said slot, and a flange secured to and spaced from said sleeve and overlying said orifice when the sleeve uncovers the orifice, whereby any dirt particles escaping through the orifice will impinge against the flange and be carried back into the tube by air entering said orifice.

3. An air flow regulator for a vacuum cleaner including an inner tube having an orifice, a sleeve located on said tube having an inclined slot and slidable along the tube to cover and uncover said orifice, a roller secured to said tube and engaging in said slot, spring means for frictionally holding said sleeve in a selected position on said tube, and a flange secured to and spaced from said sleeve and overlying said orifice when the sleeve uncovers the orifice, whereby any dirt particles escaping through the orifice will impinge against the flange and be carried back into the tube by air entering said orifice.

GUSTAF EINAR LOFGREN.

CERTIFICATE OF CORRECTION.

Patent No. 2,176,139. October 17, 1939.

GUSTAF EINAR LOFGREN.

It is hereby certified that error appears in the printed specification of the above numbered patent requiring correction as follows: Page 2, first column, line 13, for the word "construction" read constriction; and that the said Letters Patent should be read with this correction therein that the same may conform to the record of the case in the Patent Office.

Signed and sealed this 21st day of November, A. D. 1939.

(Seal)
Henry Van Arsdale,
Acting Commissioner of Patents.